G. P. ANSTISS.
WASHING MACHINE.
APPLICATION FILED SEPT. 21, 1918.
1,415,506.
Patented May 9, 1922.
5 SHEETS—SHEET 1.
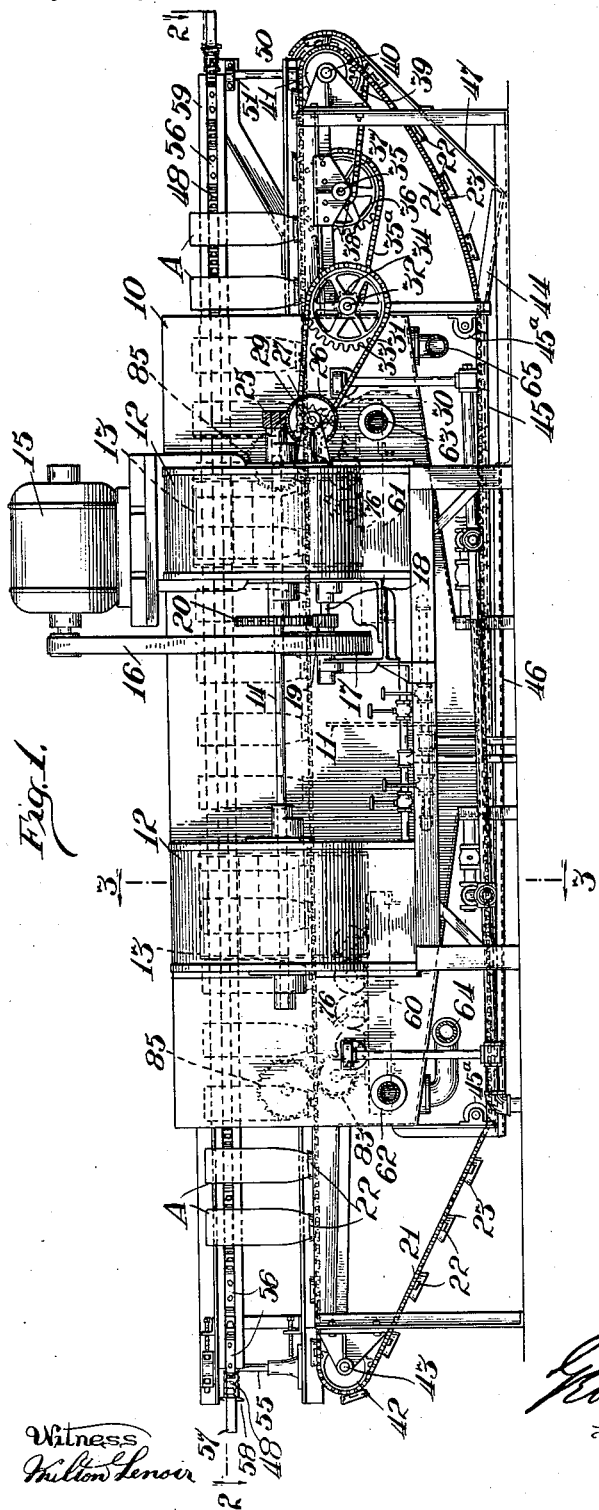
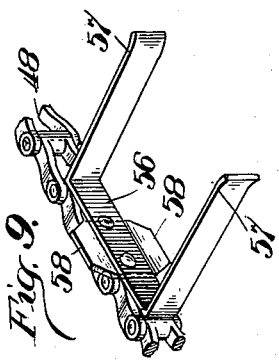
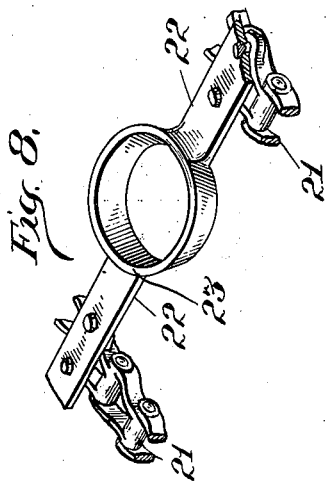

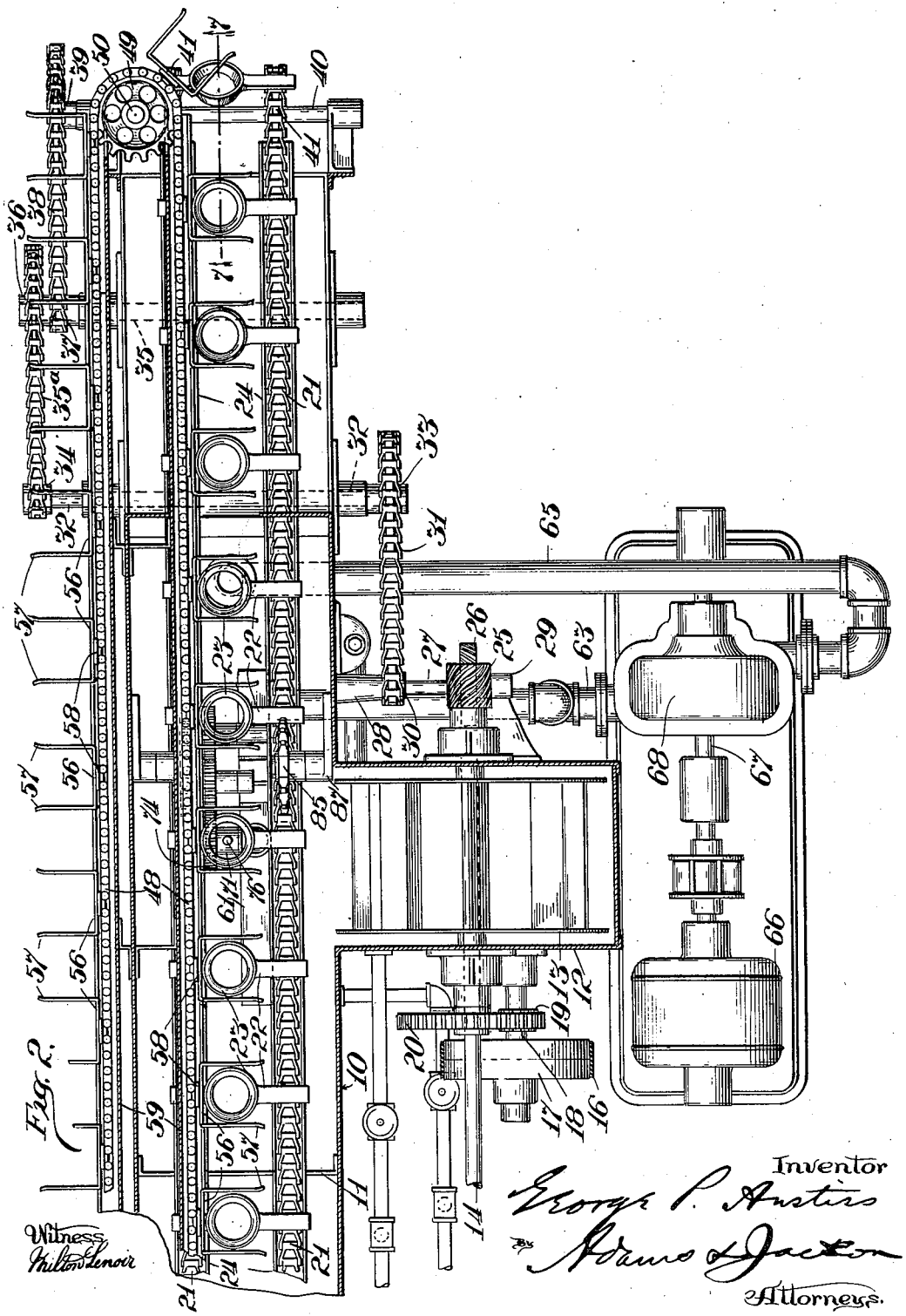

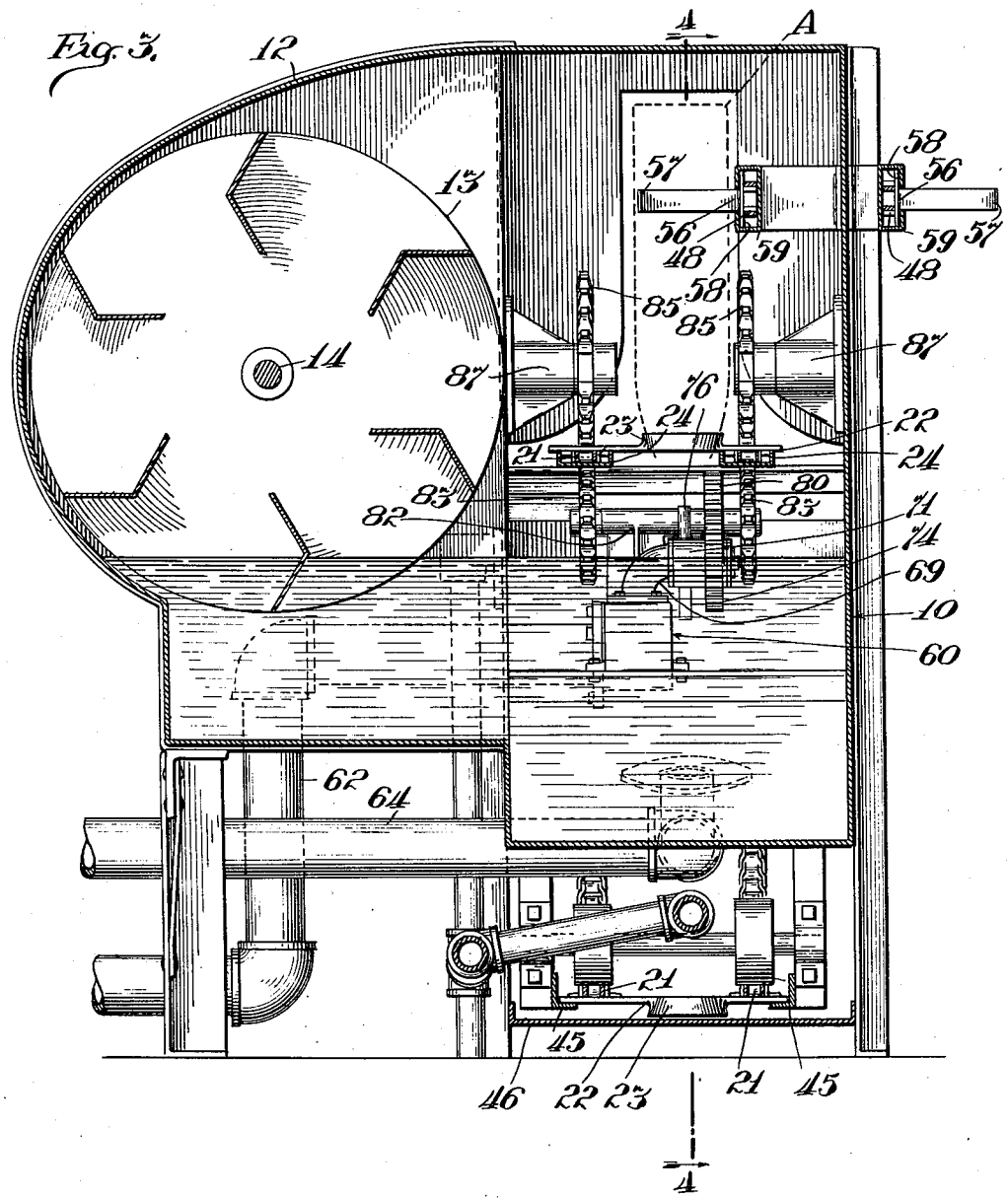

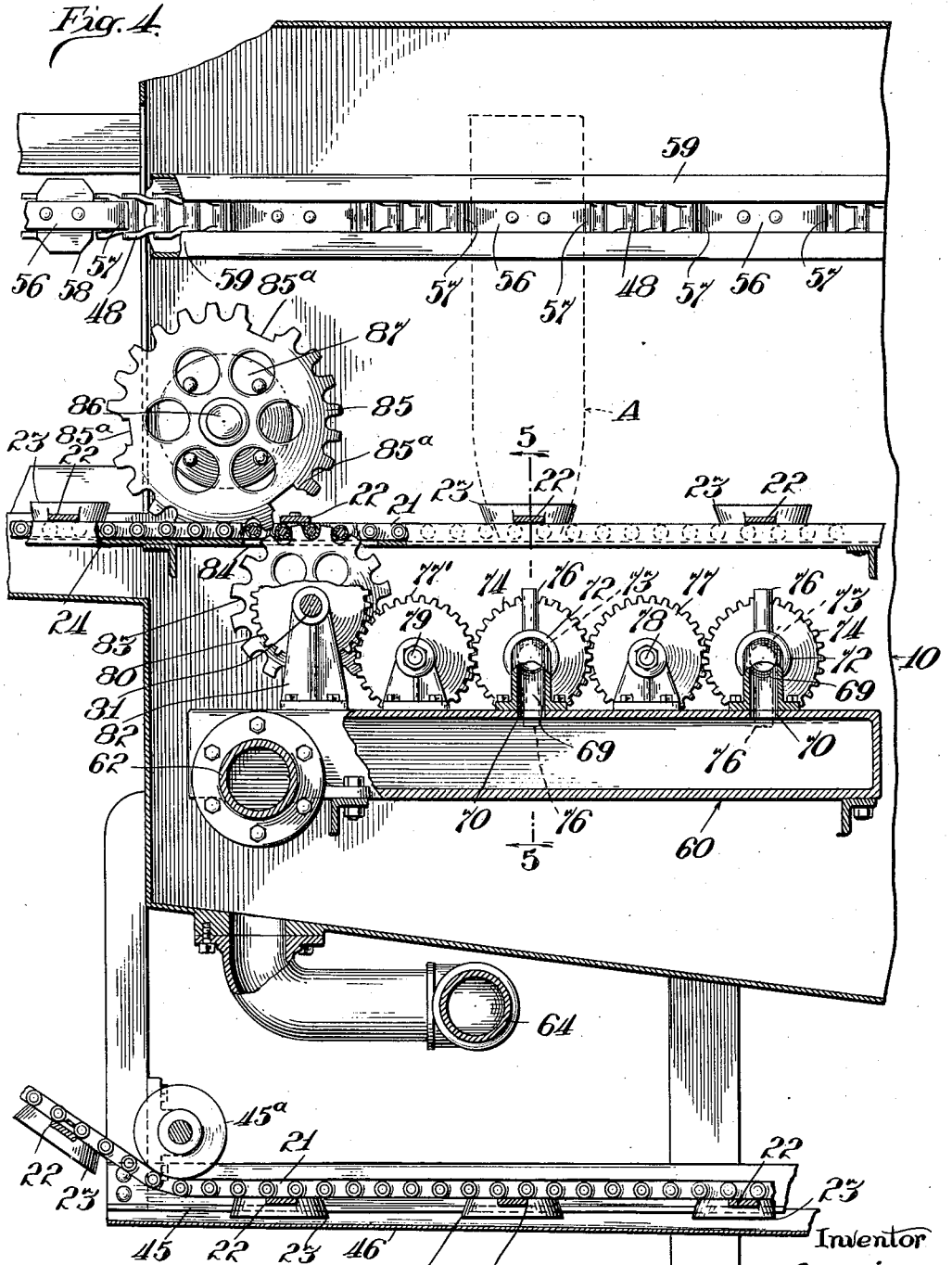

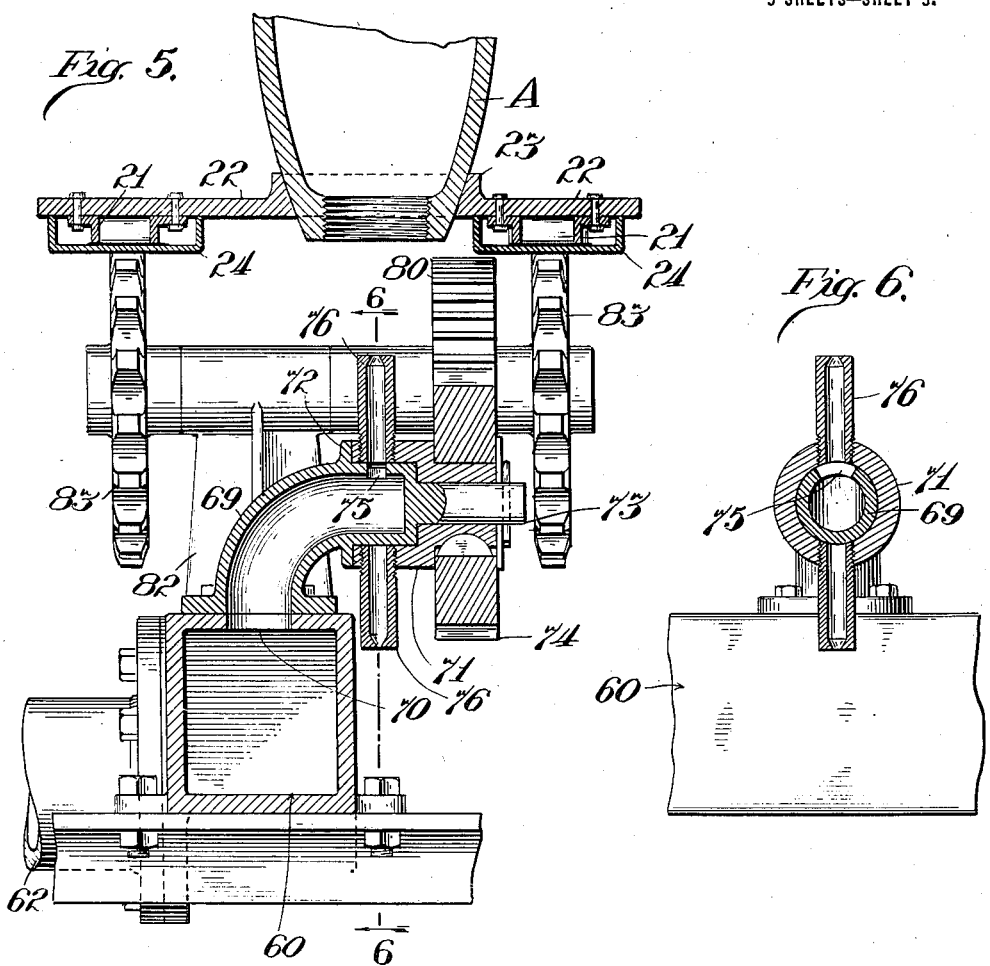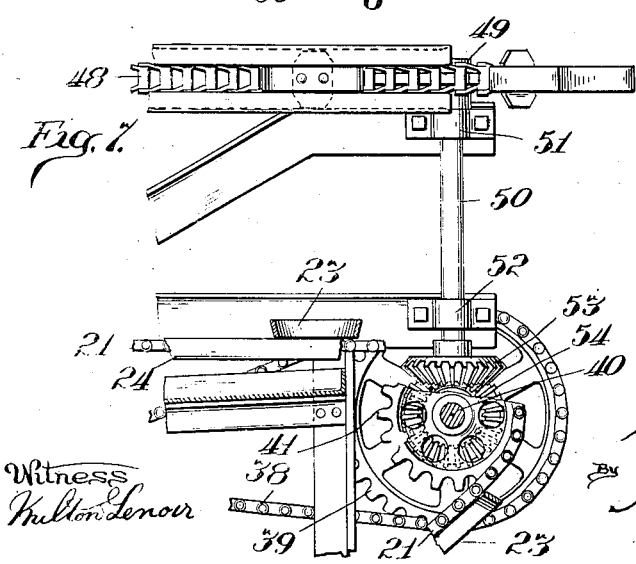

UNITED STATES PATENT OFFICE.

GEORGE P. ANSTISS, OF CHICAGO, ILLINOIS, ASSIGNOR TO G. S. BLAKESLEE & CO., OF CHICAGO, ILLINOIS, A CORPORATION OF ILLINOIS.

WASHING MACHINE.

1,415,506.   Specification of Letters Patent.   Patented May 9, 1922.

Application filed September 21, 1918. Serial No. 255,169.

*To all whom it may concern:*

Be it known that I, GEORGE P. ANSTISS, a citizen of the United States, and a resident of Chicago, in the county of Cook and State of Illinois, have invented certain new and useful Improvements in Washing Machines, of which the following is a specification, reference being had to the accompanying drawings.

This invention relates to improvements in washing machines primarily designed for simultaneously cleansing the interior and exterior of shells and will be here described in connection with its use for that particular purpose, although it is to be understood that the mechanism will be found of value in connection with the cleansing of other articles that require before being put to use to be cleansed interiorly as well as exteriorly, as for example many varieties of heavy castings. The leading object of the invention is to provide, in connection with a suitable housing through which the objects to be cleansed are drawn by suitable conveying mechanism, means for successively discharging into each one of a series of moving shells a stream of water, such stream of water being automatically turned on as the shell moves to a position to receive the stream through its open end and automatically cut off as the shell moves farther along in its path of travel. It is a further object of the invention to provide improved means for supporting the shells as they are moved through the machine, and to improve in various particulars the construction and operation of machines of this general character. These objects I accomplish as illustrated in the drawings and hereinafter described. What I regard as new will be set forth in the claims.

In the accompanying drawings,—

Fig. 1 is a side elevation of my improved washing machine but with the pumping mechanisms omitted that supply water under pressure to the chambers that the discharge nozzles communicate with, the pipes that extend between such chambers and the pumping mechanisms being shown in section;

Fig. 2 is a view partly in plan and partly in horizontal section, the section being taken at line 2—2 of Fig. 1. The view is enlarged as compared with Fig. 1 and only the right hand end portion of the machine as seen in Fig. 1 is shown;

Fig. 3 is an enlarged cross-section taken at line 3—3 of Fig. 1;

Fig. 4 is an enlarged detail being a vertical section taken at line 4—4 of Fig. 3 and illustrating the means for automatically controlling the discharge of water to the interiors of successively passing shells;

Fig. 5 is a detail, being a vertical section taken at line 5—5 of Fig. 4;

Fig. 6 is a detail, being a vertical section at line 6—6 of Fig. 5 through one of the rotating water-discharging devices;

Fig. 7 is a detail of a portion of the means by which one endless carrier is connected with and driven from the other endless carrier—the view being taken on the line 7—7 of Fig. 2;

Fig. 8 is a detail, being a perspective view of one of the shell holders connected to the lower endless carrier, a portion of such carrier being also shown; and Fig. 9 is a detail, being a perspective view of one of the shell supporting means carried by the upper one of the endless carriers, a portion of such upper carrier being also shown.

Referring to the several figures of the drawings,—10 indicates a tank which is, roughly speaking, a long box-like structure through the upper portion of which the shells to be operated upon are drawn by means of endless conveyor mechanism. The upper portions of the end walls of this tank 10 are open sufficiently to allow of the passage therethrough of the conveying mechanism and the shells carried thereby, while the lower portions of the end walls are solid so as to confine in the lower part of the tank a large body of water as indicated in Fig. 3. As indicated by dotted lines in Fig. 1, the tank is divided substantially centrally of its length into two compartments by a division wall 11, as is customary in machines of this general type, one compartment usually containing the water for the initial washing of the articles and the other compartment containing the water for the second washing or rinsing operation. The tank as a whole will ordinarily be supported by frame members preferably formed of angle bars as shown. Opposite each of the compartments into which the tank is divided by the partition 11 is a lateral extension 12 in which is located a large paddle wheel 13 of ordinary construction adapted when rotated to scoop up water from the lower part of the tank, as will be understood by an inspection of Fig. 3, and dash it against the articles that are being moved through the tank. These two paddle wheels in the construction shown are mounted upon a common shaft 14 located at a distance from one of the side walls of the tank and journaled in bearings attached to the walls of the extensions 12. This shaft is driven by means of a motor 15 shown as mounted on top of the tank 10, such motor driving a belt 16 that passes around a pulley 17 secured upon a short shaft 18, such shaft having secured to it a small gear 19 that is in mesh with a larger gear 20 on the paddle-wheel shaft 14.

The shells or other objects to be cleansed are moved through the tank from end to end thereof by means of an endless conveyor, which, in the construction shown, comprises two link chains 21 connected together at regular intervals by cross strips 22 secured to the chains in any suitable manner—preferably by rivets as shown. Each of the cross strips 22 is provided centrally with a support for receiving and sustaining one of the articles to be washed. As best shown in Fig. 8, such support consists of a rather wide and heavy ring 23 of slightly tapering form to adapt it to properly receive the tapering open end of a shell when such shell is inverted, as indicated in the drawings. The shells referred to are indicated by the letter A. As the weight of the shells supported at one time by the conveyor is very considerable it is necessary to provide supporting means for that portion of the conveyor carrying the shells, and such support, in the construction shown, is afforded by two parallel tracks 24 (see Fig. 5) extending through the tank and projecting from the ends thereof and rigidly secured in position. These tracks 24 are best made in channel form, as shown, and the link chains 21 rest upon and slide along in such channels.

Referring now to the means for driving the endless conveyor referred to,—25 indicates a worm secured upon a projecting end of the paddle wheel shaft 14, which worm meshes with a gear 26 fast on a short shaft 27 journaled in bearings 28—29, which shaft also carries a small sprocket wheel 30. Around this sprocket wheel 30 passes a sprocket chain 31 that drives a shaft 32 having mounted on one end a sprocket wheel 33 over which said chain 31 passes. This shaft 32 extends across the machine and carries at its other end a small sprocket wheel 34 that drives a shaft 35 by means of an endless chain 35ª that passes around the sprocket wheel 34 and around a large sprocket wheel 36 secured to such last-named shaft. On the shaft 36 is also secured a small sprocket wheel 37 around which passes sprocket chain 38 that also passes around a sprocket wheel 39 fast on a shaft 40 that extends across the machine and is journaled in bearings attached to the supporting framework. Upon the shaft 40 are secured two sprocket wheels 41 over which the conveyor chains 21 pass and by which the conveyor as a whole is moved. At the opposite end of the machine the conveyor chains pass over sprocket wheels 42 secured upon a shaft 43 suitably journaled in place. By the driving means shown and described the paddle wheels and the endless conveyor can be driven from the same source of power—the paddle wheels being rotated at the required high speed while the conveyor is moved very much slower comparatively, as will be understood from the description of the gearing. At the delivery end of the machine there will be a tendency on the part of the conveyor to sag after it passes over the driving sprockets 41 and in order that such sagging may not cause it to interfere with any portion of the framework I provide near the end of the machine and in line with the conveyor chains two slightly inclined guide strips 44 preferably formed of angle iron. The ends of the cross strips 22 will strike against these guide strips and pass therefrom onto tracks 45 (see Fig. 3) and which are also preferably made of angle iron. 45ª indicates guide rollers near the ends of the tracks 45, under which rollers the chains 21 pass. 46 indicates a drip pan, secured to members of the supporting framework, upon which water dripping from the conveyor parts may fall, and 47 indicates a quite sharply inclined drip pan at the delivery end of the machine for the same purpose—the latter pan having its lower end over the pan 46, and any suitable means being provided to drain off the water that falls upon both of these pans.

To obviate any liability of the shells A being dislodged from the seats 23 upon which they rest or from being disturbed, as might readily be the case when water is dashed against them from the paddle wheels or violently discharged into them by the means hereinafter described, I have provided holding means that engage them near their then upper ends, and have provided other means for moving the said holding means in unison with the endless conveyor already described. Said movable holding means comprises an endless chain apparatus, and which will hereinafter be referred to as an endless carrier to avoid confusing it with the other endless device which has been hereinbefore referred to as a conveyor. This endless carrier includes a chain, indicated by 48, the links of which are adapted to be engaged by suitable sprocket wheels. The sprocket wheel that acts to drive this carrier is indicated by 49 (see Fig. 2) and is mounted in a horizontal position on the upper end of a vertical shaft 50 at the delivery end of the machine. This shaft 50 (see Fig. 7) is mounted in bearings 51—52 bolted to members of the supporting framework, and at its lower end has secured to it a bevel gear 53 that is in mesh with and driven by another bevel gear 54 fast on the shaft 40 which carries the sprockets that drive the conveyor chains 21. At the opposite end of the machine the carrier chain 48 passes over another sprocket wheel similar to 49 and mounted upon a shaft 55. The bearings for this last-named shaft are preferably slidingly mounted, as indicated in Fig. 1, in order to effect the desired tension of the carrier. Secured to the endless carrier chain 48 at intervals are devices adapted to engage the shells and hold them firmly in an upright position while resting on their ring-like seats 23. Each of such holding devices is formed in the construction shown of a piece of metal bent upon itself to form a base or attaching member indicated by 56 (see Fig. 9) and two arms 57, the ends of such arms being slightly turned outwardly to facilitate the forcing of a shell between the arms. One of these holding devices will be attached to the carrier chain 48 in such position that it can receive between its arms 57 and hold in an upright position a shell resting on a seat 23. The member 56 of each holding device is secured to the side of the endless chain 48 by rivets, as shown, or otherwise, and interposed between such member and the chain is a plate 58, the upper and lower edges of which are parallel with each other. 59 indicates a track or guideway made in two parallel sections, as best shown in Fig. 2, and each section located with reference to the sprocket wheels over which the carrier chain 48 runs so that such carrier chain may be freely moved through such track sections in straight lines. These track or guide members are located respectively inside and outside of the tank and at that side of the tank opposite the paddle-wheels, so that the force of the water delivered by such wheels will not tend to move the shells out of the embrace of the arms 57. The tracks are slotted from end to end to allow of the projection therethrough of the said arms 57. The plate 58 that each holding member has secured to it at its base is of such height that it fits fairly closely between the upper and lower walls of the track or guideway sections, but not close enough to prevent free movement therealong. By providing these plates 58 that fit in the guideways as described any tendency of the shell holding members to twist or turn will be obviated and thus compel the holders to maintain the shells that they embrace in a perfectly upright position on the respective seats 23. Furthermore by reason of being wider than the chain they act as runners and materially reduce the friction below that which would occur if the chain rested throughout its length on the track.

Referring now to the means by which streams of water are automatically and forcibly discharged into the moving shells and the water supply cut off after the shells pass beyond the water discharged outlets, 60 indicates a water chamber which is here shown as a rectangular elongated hollow casting located in, and near the receiving end of, the tank 10 and extending longitudinally of such tank and suitably secured in position below the path of travel of that portion of the conveyor upon which the shells A rest. This water chamber 60 is, therefore, it will be noted, in that division of the tank 10 that contains the water that has been referred to as the first washing water as distinguished from the body of water in the other compartment that is used for rinsing purposes. In such other compartment there is located another chamber similar to the chamber 60 and arranged in the same manner, such second-named chamber being indicated in dotted lines in Fig. 1 and marked with the numeral 61. To each of these chambers water is forced under pressure by a suitable pumping means through suitable pipes, the supply pipe for the chamber 60 being indicated by 62 and that for the other chamber by 63. The water supplied to each of the chambers is drawn from the bodies of water in the respective divisions of the tank 10, the pipe for this purpose in connection with the chamber 60 being indicated by 64 and the corresponding pipe at the other end being indicated by 65. In view of the difference in character of the wash water and rinsing water I provide two sets of pumping mechanism for keeping water in the respective chambers 60 and 61 filled under pressure, and as such pumping mechanism will be similar in all respects I have not deemed it necessary to illustrate but one—that one being the one used in connection with the chamber 61. Such mechanism comprises a motor 66, on the shaft 67 of which is mounted a rotary pump 68 that draws its supply, as stated, from one of the divisions of the tank 10 and forces it into the chamber that such pump is connected with.

Referring now to the means for forcibly discharging into the moving shells wash water that is held under pressure in the chamber 60 and automatically cutting off the discharge of water after such washing of a shell—69 indicates, as best shown in Figs. 4 and 5, two short curved pipes bolted to the top wall of the chamber 60 and communicating with the interior thereof through openings 70 in such wall. On the outer horizontal end of each of such pipes 69 is rotatably mounted a valve 71, one end of which abuts against an annular flange 72 formed on the pipe 69. The horizontally disposed end portion of the pipe 69 is closed and has projecting from it a cylindrical stem 73, preferably formed with the pipe as shown, which stem serves as a journal or shaft on which an extended portion of the valve rotates, and on this extended portion of the valve is fixedly secured a gear 74. 75 indicates a port in the horizontal portion of the pipe 69, such port being in the form of a slot, as best shown in Fig. 6, and 76 indicate two discharge nozzles screw-threaded into the rotary valve 71, or otherwise secured in place, such nozzles being located diametrically opposite each other and so arranged on the valve as to be successively brought over the port 75. As shown (see Fig. 4) the two pipes 69 provided for the chamber 60 are separated by a distance sufficient to locate between the two gears 74 an idler gear 77 that meshes with them, such idler gear being mounted upon a short shaft 78 suitably journaled in brackets bolted to the top wall of the chamber 60 as shown. 77' indicates another idler gear on the shaft 79 mounted as is the shaft for the idler 77, the idler 77' being located so as to mesh with and drive that one of the gears 74 that is toward the receiving end of the tank. The arrangement of gearing shown and described obviously compels the turning of the two valves 71 that carry the nozzles 76 in the same direction and at the same rate of speed. These valves are caused to turn by the engagement with the idler 77' of a gear 80 mounted on a shaft 81 supported in bearings furnished by brackets 82 bolted to the top wall of the chamber 60 as are the shaft supporting brackets for the idlers 77—77'. Upon the shaft 81 are secured two toothed wheels 83 that are arranged beneath the endless chains 21 of the conveyor and of a diameter to cause the links of such chains to engage the teeth of the wheels and thus cause their rotation, and, through the gearing described, a rotation of the two valves 71. It will be noted (see Fig. 4) that those edges of the teeth against which the links of the chain press are slightly curved so as to ensure a better holding of the chain links with the wheels. As shown in Fig. 4, the channel shaped tracks 24 are slotted as at 84 to permit the required projection therethrough of the wheels 83 so that their teeth may engage as stated with the conveyor chains. I deem it advisable to provide means for compelling a firm contact of the conveyor chains with the toothed wheels 83 so that there will be no possibility of the chains failing to rotate the wheels in perfect timed relation to the movement of the conveyor and thereby disturb the timing of the discharge of water from the nozzles 76. The means referred to for thus compelling this perfect engagement of the chains and toothed wheels consists in the construction shown of two large toothed wheels 85 each rotatably mounted on a short shaft 86 supported in a bearing 87 affixed to a wall of the tank 10. Each of these large toothed wheels 85 is arranged over one of the chains 21 of the endless conveyor and is of such diameter that its teeth are engaged by such chains. As shown, each wheel 85 is so cut on its periphery as to provide wide spaces 85ᵃ that will properly fit over and receive the cross strips 22 of the conveyor. By providing these rotatable wheels 85 above the chains and so arranging them that they engage the chains just before the toothed wheels 83 are engaged by the chains it will be evident that the chains must at all times be held in perfect engagement with the wheels 83 and thereby the discharge of the water through the nozzle 76 be effected at the required and predetermined times.

From the foregoing description of the rotary valves and the mechanism for operating the same, it will be evident that as each shell A is moved opposite one of the valve mechanisms such valve will have been turned to bring one of its nozzles over the port 5 in the pipe 69, and as such port is in the form of an opening elongated circumferentially of the valve it is evident that when the discharge nozzle commences to communicate with such port the nozzle will be in a slightly inclined position, and that will cause the water that discharges therefrom to strike against the interior wall of the shell at one side and then as the movement continues the water will be discharged directly against the upper end wall of the shell and thereafter against the the other side of the interior of the shell—thus accomplishing a very thorough washing of the interior of the shell. By the use of the two valves as shown in Fig. 4, two shells will have water discharged into them simultaneously and by the provision of two nozzles for each valve and with the driving gears proportioned as shown each shell will have two distinct and separate washing operations as distinguished from the subsequent rinsing operation. Of course, if it is desired to subject a shell to but a single such washing operation, one of the idlers and one of the valves may be omitted, while on the other hand if a greater washing operation than that described may be desired, or if it be desired to operate on more than two shells simultaneously, any required number of additional valves and means for operating the same may be provided.

In connection with the rinsing operation I have not deemed it necessary to provide more than a single rotating valve, and such single valve and its operating mechanism are only shown in dotted lines in connection with the chamber 61 at the right hand side of Fig. 1. Inasmuch as the valve mechanism for discharging rinsing water is to be exactly as described for either one of the valves shown in detail in connection with the washing operation, I have not deemed it necessary to show the same in detail.

I have not described any means for keeping the lower portion of the tank filled with water, although in Fig. 1 and in some of the other figures I have shown pipes and valves that constitute a system for filling the two compartments of the tank separately and have also shown pipes for carrying away the water when it reaches a certain height in the compartments. Such pipe systems form no part of my present invention and as they may be of any desired arrangement no detailed description of them is here thought necessary.

What I claim as my invention and desire to secure by Letters Patent, is—

1. A washing machine comprising in combination a tank, a conveyor movable through said tank in a substantially straight path for supporting articles to be washed, means for containing water under pressure and provided with a discharge port opposite the substantially straight path of travel of the articles on the conveyor, said port being elongated in the direction of such travel, a rotatable valve for controlling the discharge of water through such port, a nozzle carried by said valve located at a distance from and out of contact with any article to be washed, and adapted to be brought at intervals over said port and moved lengthwise thereof to cause water to be discharged against different parts of an article on said conveyor, and means for moving said conveyor and valve in timed relation.

2. A washing machine comprising in combination a tank, a conveyor movable therethrough and comprising an endless chain, a track on which said conveyor-chain is movably supported, a rotatable toothed wheel located below said track and projecting through an opening in the track and having its teeth in engagement with said chain, a second rotatable toothed wheel located above the track and also engaging said chain to prevent disengagement of such chain from the first-named wheel, means for holding a supply of water under pressure, in which means is a port through which water is discharged against articles supported by said conveyor, a rotatable valve for controlling said port, and means interposed between said first-named wheel and said valve for rotating said valve.

3. A washing machine comprising in combination a tank, a conveyor movable therethrough and comprising an endless chain, a rotatable toothed wheel in constant engagement with and driven by said chain, means on the opposite side of said chain for preventing the disengagement of the chain from said toothed wheel, means for holding a supply of water under pressure, a rotatable valve for controlling an elongated port in said water-holding means through which water is discharged in an arc of a circle against different parts of an article supported by the conveyor, and means interposed between said toothed wheel and the valve for rotating said valve.

4. A washing machine comprising in combination a tank, a conveyor movable therethrough and comprising an endless chain, a rotatable toothed wheel in constant engagement with and driven by said chain, a second rotatable toothed wheel at the opposite side of said chain and in engagement therewith to prevent disengagement of the chain from said first-named wheel, means for holding a supply of water under pressure, a rotatable valve for controlling a port in said water-holding means through which water is discharged against articles supported by the conveyor, and means interposed between said first-named toothed wheel and the valve for rotating said valve.

5. A washing machine comprising in combination a tank for containing a body of water, an endless conveyor movable through the tank for supporting hollow articles to be washed, a chamber for holding a quantity of water under pressure, said chamber being provided with a discharge port elongated in the direction of travel of the conveyor, a rotatable valve for controlling said port and intermittently permitting the discharge of water therethrough toward different parts of the interiors of successive articles on said conveyor, other means for drawing water from the tank and dashing it against the exteriors of such articles, means controlled by the movement of the conveyor mechanism for actuating said valve, and a single driving means common to said conveyor-mechanism and said water-dashing means.

6. A washing machine comprising in combination a tank, two conveying mechanisms comprising a lower conveying mechanism and an upper carrier movable through the tank for supporting articles to be washed, an intermittently operating device for discharging water against successive articles resting upon said lower conveying mechanism, means controlled by the movement of one of said conveying mechanisms for actuating said intermittently-operating water-discharging device, and means for driving one of said conveying mechanisms from the other of such mechanisms.

7. A washing machine comprising in combination a tank, two conveying mechanisms comprising a lower conveying mechanism and an upper carrier movable through the tank for supporting articles to be washed, an intermittently operating device for discharging water against successive articles resting upon said lower conveying mechanism, means controlled by the movement of one of said conveying mechanisms for actuating said intermittently-operating water-discharging device, and gearing interposed between the two conveying mechanisms for compelling their movement in unison.

8. A washing machine comprising in combination a tank, two conveying mechanisms comprising a lower conveying mechanism and an upper carrier movable through the tank for supporting articles to be washed, an intermittently-operating device located opposite said lower conveying mechanism for discharging water through such conveying mechanism into successive hollow articles resting thereon, means controlled by the movement of said last-mentioned conveyor for actuating said intermittently-operating water-discharging device, and means for driving one of said conveying mechanisms from the other of such mechanisms.

9. A washing machine comprising in combination a tank, a conveyor movable through the tank and provided with supports for articles to be washed to rest upon, a carrier conveyor located above the first-named conveyor and provided with holding means for engaging and maintaining in upright position the articles to be washed, means for driving said two conveyors in unison, and means for forcing water against the articles supported by said conveyors.

10. A washing machine comprising in combination a tank, a conveyor movable through the tank and provided with supports for articles to be washed to rest upon, a carrier conveyor located above the first-named conveyor and provided with holding means for engaging and maintaining in upright position the articles to be washed, means for applying power to one of said conveyors for driving it, means for driving the other conveyor from the one so driven, and means for forcing water against the articles supported by the conveyors.

11. A washing machine comprising in combination a tank, a conveyor movable through the tank and provided with supports for articles to be washed to rest upon, a carrier conveyor located above the first-named conveyor and provided with holding means for engaging and maintaining in upright position the articles to be washed, means for driving one of said conveyors from and in unison with the other conveyor, water-discharging means located below the lower conveyor for forcing water through such conveyor against the articles carried thereby, and other water-discharging means located at one side of said conveyors.

12. A washing machine comprising in combination a tank, an endless conveyor movable through the tank and provided with supports for articles to be washed to rest upon, vertically-disposed sprocket wheels around which the conveyor passes, an endless carrier located at a distance from said conveyor and provided with holding means for engaging and maintaining in upright position the articles to be washed and that are resting upon said conveyor, sprocket wheels around which said carrier passes, means for driving said conveyor and carrier in unison, and means for discharging water against the articles carried by said conveyor.

13. A washing machine comprising in combination a tank, an endless conveyor movable through the tank and provided with supports for articles to be washed to rest upon, vertically-disposed sprocket wheels around which the conveyor passes, an endless carrier located at a distance from said conveyor and provided with holding means for engaging and maintaining in upright position the articles to be washed and that are resting upon said conveyor, horizontally-disposed sprocket wheels around which said endless carrier passes, means for applying power to one of said endless devices to move it through the tank, means for driving the other endless device from such driven device, and means for discharging water against the articles carried by said conveyor.

14. A washing machine comprising in combination a tank, an endless conveyor movable through the tank and adapted to have rest thereon articles to be washed, sprocket wheels opposite the ends of the tank mounted on horizontal shafts and over which sprocket wheels said conveyor passes, an endless carrier located at a distance from said conveyor, means on said carrier for engaging and maintaining in upright position the articles resting on said conveyor, sprocket wheels mounted on vertical shafts and over which last-named sprocket wheels said carrier passes, intermeshing gearing carried by one of each of said horizontal and vertical shafts to cause both of said endless devices to be moved in unison, and means for discharging water from the tank against the articles on the conveyor.

15. A washing machine comprising in combination a tank, an endless conveyor movable through the tank and upon which are adapted to rest articles to be washed, means at one side of the tank for discharging water across the tank upon the articles on the conveyor, an endless carrier movable through the upper portion of the tank and located adjacent to that side of the tank opposite that at which said water-discharging means is located, holding means on said carrier for engaging and maintaining in upright position the articles resting on said conveyor, and fixed guide or track members for said carrier, one of said members being secured inside of the tank and extending from end to end thereof and the other member located outside of said tank, and also extending longitudinally thereof.

16. A washing machine comprising in combination a tank, an endless conveyor movable through the tank and upon which are adapted to rest articles to be washed, means at one side of the tank for discharging water toward the opposite side of the tank upon the articles on said conveyor, other means for discharging water upward from below said conveyor to strike against said articles, an endless carrier movable through the upper portion of the tank and located toward that side of the tank opposite that at which said first-mentioned water-discharging means is located, holding means on said carrier for engaging and maintaining in position the articles resting on said conveyor, and means for moving said conveyor and carrier.

17. A washing machine comprising in combination a tank, an endless conveyor movable through the tank and upon which are adapted to rest articles to be washed, means at one side of the tank for discharging water across the tank upon the articles on the conveyor, an endless carrier movable through the upper portion of the tank and located toward that side of the tank opposite that at which said water-discharging means is located, holding means carried by the carrier for engaging and maintaining in upright position the articles resting on said conveyor, and a fixed guide or track for said carrier.

18. A washing machine comprising in combination a tank, an endless conveyor movable through the tank and upon which are adapted to rest articles to be washed, means at one side of the tank for discharging water across the tank upon the articles on the conveyor, an endless carrier movable through the upper portion of the tank and located toward that side of the tank opposite that at which said water-discharging means is located, a plurality of holders carried by the carrier, each holder comprising two arms spaced apart to receive between them one of the articles resting upon said conveyor with the free ends of said arms towards that side of the tank at which the water-discharging means is located, and a fixed guide or track for said carrier.

19. A washing machine comprising in combination a tank, an endless conveyor movable through the tank and adapted to support thereon articles to be washed, means at one side of the tank for discharging water toward the opposite side of the tank and upon the articles on the conveyor, an endless carrier movable through the tank above the said conveyor, means on said carrier for engaging and steadying the articles on the conveyor, a fixed guide or track member secured on the inside of the tank and longitudinally thereof, a second guide or track member also arranged longitudinally of the tank but on the outside thereof, and a plurality of vertically-disposed guiding members secured to said endless carrier and supporting said carrier on said guide or track members.

20. In a washing machine, the combination with a tank of two endless devices movable through the tank in planes one above the other, the lower one of said devices being adapted to have articles to be washed supported thereon and being arranged to travel around and beneath the bottom of the tank and the upper one of said devices having means to engage the articles resting on the said lower movable device to aid in supporting them in upright position and being arranged to travel around and opposite one of the side walls of the tank, means for moving said two endless devices in unison, and means for discharging water against the articles resting upon said lower endless device.

21. In a washing machine, the combination with a tank of two endless devices movable through the tank in planes one above the other, the lower one of said devices being adapted to have articles to be washed supported thereon and being arranged to travel around and beneath the bottom of the tank and the upper one of said devices having means to engage the articles resting on the said lower movable device to aid in supporting them in upright position and being arranged to travel around and opposite one of the side walls of the tank, means for moving said two endless devices in unison, and means located adjacent to the other side wall for discharging water against the articles resting upon said lower endless device.

22. In a washing machine, the combination with a tank of two endless devices movable through the tank in planes one above the other, the lower one of said devices being adapted to have articles to be washed supported thereon and being arranged to travel around and beneath the bottom of the tank and the upper one of said devices having means to engage the articles resting on the said lower movable device to aid in supporting them in upright position and being arranged to travel around and opposite one of the side walls of the tank, means for moving said two endless devices in unison, means located adjacent to the other side wall for discharging water against the articles resting upon said lower endless device, and other means located below said lower endless device adapted to discharge water upwardly toward and against such articles.

GEORGE P. ANSTISS.